(12) United States Patent
Kanitz et al.

(10) Patent No.: US 6,228,977 B1
(45) Date of Patent: May 8, 2001

(54) NONLINEAR OPTICALLY ACTIVE COPOLYMERS

(75) Inventors: Andreas Kanitz, Hoechstadt; Christian Fricke, Berlin, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/375,964

(22) Filed: Aug. 17, 1999

(30) Foreign Application Priority Data

Aug. 17, 1998 (DE) ................................ 198 37 252

(51) Int. Cl.$^7$ .......................... C08G 63/00; C08F 69/00; C08F 126/06; C08F 128/00; C08F 12/30

(52) U.S. Cl. ....................... 528/327; 528/360; 528/363; 528/362; 528/373; 528/377; 526/256; 526/258; 526/286; 526/297; 526/298; 526/299; 525/376; 525/377

(58) Field of Search ...................................... 528/327, 373, 528/377, 360, 362, 363; 526/256, 253, 286, 298, 297; 525/376, 377

(56) References Cited

U.S. PATENT DOCUMENTS

| | | | |
|---|---|---|---|
| 4,796,976 | 1/1989 | Leslie et al. | 252/299.01 |
| 4,915,491 | 4/1990 | DeMartino et al. | 428/1 |
| 5,273,863 | * 12/1993 | Horn et al. | 430/270 |
| 5,384,378 | * 1/1995 | Etzbach et al. | 526/256 |
| 5,401,612 | * 3/1995 | Etzbach et al. | 430/285 |
| 5,483,005 | * 1/1996 | Etzbach et al. | 525/328.2 |
| 5,502,135 | * 3/1996 | Beckmann et al. | 526/262 |
| 5,616,678 | * 4/1997 | Beckmann et al. | 528/73 |
| 6,001,958 | * 12/1999 | Tapolsky et al. | 528/360 |

FOREIGN PATENT DOCUMENTS

| | | |
|---|---|---|
| 196 39 446 A1 | 3/1998 | (DE). |
| 196 39 447 A1 | 3/1998 | (DE). |
| 196 39 445 A1 | 4/1998 | (DE). |
| 0 350 112 A1 | 1/1990 | (EP). |
| 0 648 792 A1 | 4/1995 | (EP). |

OTHER PUBLICATIONS

International Patent Application WO 97/19088 (Polis), dated May 29, 1997.

Luping Yu et al.: "Synthesis and Characterization of New Polymers Exhibiting Large Optical Nonlinearities. 3. Rigid–Rod/Flexible–Chain Copolymers", J. Am. Chem Soc., 1989, 111, pp. 8699–8702, The month in the date of publication is not available.

Theodor Tamir (Ed.): "Guided–Wave Optoelectronics", Springer Verlag Berlin, Heidelberg 1988, p. 155, The month in the date of publication is not available.

C. C. Teng et al.: "Simple reflection technique for measuring the electro–optic coefficient of poled polymers", Appl. Phys. Lett. 56 (18), Apr. 30, 1990, pp. 1734–1736.

"Organic Syntheses, vol. 61", pp. 34–38 (No date) The date of publication is not available.

J. D. Swalen et al.: "Poled Epoxy Polymers For Optoelectronics" in J. Messier et al. (ed.): "Organic Molecules for Nonlinear Optics and Photonics", Kluwer Academic Publishers, Dordrecht/Boston/London, pp. 433–445 The date of publication is not available.

K. D. Singer et al.: "Orientationally Ordered Electro–Optic Materials" in Paras N. Prasad et al. (ed.): "Nonlinear Optical And Electroactive Polymers", Plenum press, New York and London, pp. 189–204; (No date) The date of publication is not available.

Tobin J. Marks et al.: "Entwurf, Synthese und Eigenschaften von Molekülaggregaten mit ausgeprägten nichtlinearen optischen Eigenschaften zweiter Ordnung", Angew. Chem. 1995, 107, pp. 167–187, design, synthesis and characteristics of molecular aggregates having distinctive nonlinear optical characteristics of the second degree in the journal for applied chemistry, The month in the date of publication is not available.

\* cited by examiner

Primary Examiner—P. Hampton-Hightower
(74) Attorney, Agent, or Firm—Herbert L. Lerner; Laurence A. Greenberg; Werner H. Stemer

(57) ABSTRACT

The nonlinear optically active copolymers according to the invention are polyadducts of at least one organic di- or polycyanate and a nonlinear optically active compound, i.e. a chromophore. These copolymers have outstanding thermal stability and are suitable for the fabrication of technically useful electro-optical and photonic components with long-term stability.

14 Claims, No Drawings

NONLINEAR OPTICALLY ACTIVE COPOLYMERS

BACKGROUND OF THE INVENTION

Field of the Invention

The invention concerns nonlinear optically active copolymers and also electro-optical and photonic components including such copolymers.

Polymers with nonlinear optical properties (NLO polymers) are known to the art. Such materials are employed, for example, as electro-optical switches and are used in applications in areas of data processing and integrated optics, such as optical chip-to-chip connections, waveguiding in electro-optical layers, the Mach Zehnder interferometer and optical signal processing in sensorics.

An overview of current problems associated with the development of materials with pronounced nonlinear optical properties has appeared in "Angewandte Chemie", Vol. 107 (1995), pp. 167 to 187. In addition to the requirements which must be met by the chromophores with nonlinear optical properties, problems are also pointed out which arise in the development of polymeric matrices for embedding the chromophores and the stable alignment of their orientation.

In order for polymers provided with covalently bound or dissolved nonlinear optical chromophores to become nonlinearly optically active and to possess a high 2nd order susceptibility, the chromophores must be oriented in the electric field (cf. J. D. Swalen et al. in J. Messier, F. Kajzar, P. Prasad "Organic Molecules for Nonlinear Optics and Photonics", Kluwer Academic Publishers, Dordrecht, 1991, pp. 433 to 445). Orientation normally proceeds in the region of the glass transition temperature, where the mobility of the polymer chain segments enables orientation of the nonlinear optical chromophores to take place. The orientation achieved in the field is then frozen by cooling or better by cross-linking the polymer.

The 2nd order susceptibility $\chi^{(2)}$ thereby attainable is proportional to the space density of the hyperpolarizability $\beta$, to the ground state dipole moment $\mu_0$ of the chromophores, to the electric polarization field and to parameters which describe the orientation distribution after the polarization process (cf. K. D. Singer et al. in P. N. Prasad, D. R. Ulrich "Nonlinear Optical and Electroactive Polymers", Plenum Press, New York, 1988, pp. 189 to 204).

Compounds with both a high dipole moment and high $\beta$ values are of great interest. For this reason investigations have been made especially of chromophores which consist of conjugated π-electron systems which carry an electron donor at one end of the molecule and an electron acceptor at the other and which are covalently bound to a polymer, for example to polymethyl methacrylate (U.S. Pat. No. 4,915,491), polyurethane (European Patent Application EP 0 350 112) or polysiloxane (U.S. Pat. No. 4,796,976).

Known polymeric materials with nonlinear optical properties have the disadvantage, however, that relaxation of the oriented chromophore constituents takes place with the resulting loss of the nonlinear optical activity. This relaxation effect currently prevents the preparation of technically useful electro-optical components possessing long-term stability.

A further disadvantage of known polymeric materials with nonlinear optical properties is that it is not possible to modify the value of the NLO coefficient and other important parameters such as refractive index and glass transition temperature. As a result of their chemical structure, the chromophoric systems previously described also possess insufficient thermal stability to withstand without damage the thermal stresses arising during the fabrication and/or use of the electro-optical and photonic components. Thus a significant decrease in the measured electro-optical coefficients already takes place at a temperature of 85° C. as a result of the relaxation process of the chromophores in the polymer matrix. Stability of the optical coefficients at temperatures above 100° C. is actually desirable and for this reason a significantly higher glass transition temperature is needed for the polymeric material.

SUMMARY OF THE INVENTION

It is accordingly an object of the invention to provide nonlinear optically active polymer materials overcoming the above disadvantages and with stable nonlinear optical activity. It is a particular object to provide nonlinear optically active polymer materials in which relaxation of the chromophores is prevented up to temperatures above 100° C. and whose chromophore substituents are stable to thermal oxidation for long periods at temperatures above 200° C.

With this and other objects in view there is provided in accordance with the invention a nonlinear optically active copolymer comprising a polyadduct of (a) at least one organic cyanate having at least two cyanate groups linked to an organic group which can be aliphatic or aromatic, and (b) a nonlinear optically active compound with the following structure:

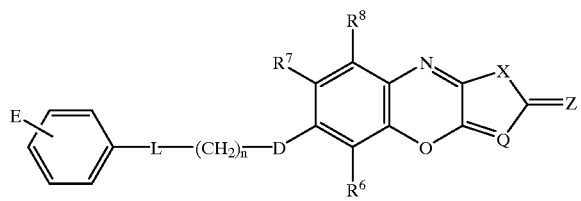

in which n=2 to 6, $R^6$, $R^7$, and $R^8$ are independently of one another an H atom, a straight-chain or branched-chain $C_1$- to $C_{20}$-alkyl residue which can be interrupted by 1 to 5 ether oxygen groups, or a phenyl, naphthyl, thienyl, thiazolyl or pyridyl residue, D=O, S or $NR^9$, whereby $R^9$ is a hydrogen atom, a straight-chain or branched-chain $C_1$- to $C_{20}$-alkyl residue which can be interrupted by 1 to 5 ether oxygen groups, a benzyl residue or a phenyl or naphthyl residue, L=O, COO or OCO, E=OH, $NH_2$, OCN or a residue with the structure

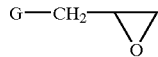

i.e. a glycidyl residue bearing the group G, with G=O, OCO (O at $CH_2$) or $NR^{10}$, whereby $R^{10}$ is an H atom or a straight-chain $C_1$- to $C_6$-alkyl residue, Z is an electron-acceptor substituted methylene or imino group, X is S, O, $NR^{11}$ or a ring double bond or

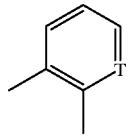

wherein $R^{11}$ is a hydrogen atom, a straight-chain or branched-chain $C_1$- to $C_{20}$-alkyl residue or a phenyl or naphthyl residue and T is CH or N or Z and T together form a structure of type $=N-SO_2-C\equiv$, $=N-CS-C\equiv$ or $=N-CO-C\equiv$, and Q is a CH— or $CR^{12}$-group or N, whereby $R^{12}$ is a straight-chain or branched-chain $C_1$- to $C_{20}$-alkyl residue or a phenyl or naphthyl residue.

In accordance with a particular feature of the invention, the organic cyanate has the following structure:

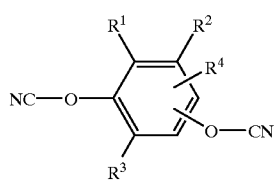

(1)

in which $R^1$, $R^2$, $R^3$, $R^4$=H, halogen, $C_1$- to $C_{10}$-alkyl, $C_3$- to $C_6$-cycloalkyl, $C_1$- to $C_{10}$-alkoxy or phenyl, whereby the alkyl and phenyl groups can be fully or partly fluorinated;

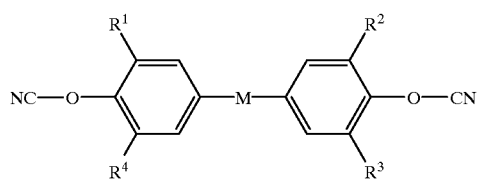

(2)

in which

M is a chemical bond, O, S, SO, $CF_2$, $CH_2$, $CH(CH_3)$, $C(CH_3)_2$, $C(CF_3)_2$, N=N, CH=CH, COO, CH=N, CH=N—N=CH, alkylenoxyalkylene with a $C_1$- to $C_8$-alkylene residue or a residue with the structure

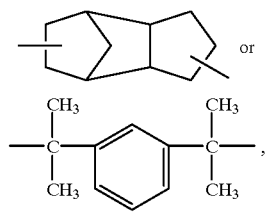

wherein $R^1$, $R^2$, $R^3$ and $R^4$ have the meaning given above;

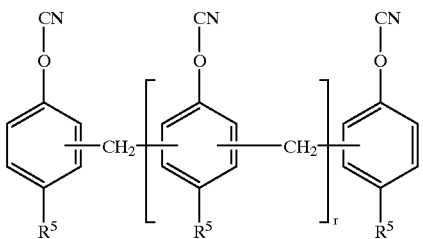

(3)

in which r=0 to 20, $R^5$=H or $C_1$- to $C_5$-alkyl; or (4) $NC-O-(CF_2)_p-O-CN$ wherein p is an integer from 4 to 12.

In preferred embodiments of the nonlinear optically active copolymer of the invention, each of the substituents $R^1$ to $R^5$ represent a hydrogen atom. The residue Z is preferably a dicyanomethylene, alkoxycarbonylcyanomethylene, cyanimino or alkoxycarbonylimino group. The group Y preferably represents CH and the group X preferably represents a 1,2-annellated benzene ring.

Improved properties of the NLO materials provided by the invention include a high level of NLO activity and thermal stability which can be exploited for the fabrication of electro-optical and photonic components. Thus the copolymers according to the invention eliminate the problems associated with the materials of the prior art, which have a lower NLO activity and a lower glass transition temperature, so that the NLO effect is inadequate for the above applications and the anisotropic properties are subject to a too rapid relaxation.

The di- and polycyanate reactants used according to the invention, and their prepolymers, are known per se from adhesive and lamination technology. Dicyanates of perfluorinated dihydroxyalkanes with 4 to 12 C atoms have also proved to be especially suitable.

Following are representative organic cyanate reactants preferred for use according to the invention:

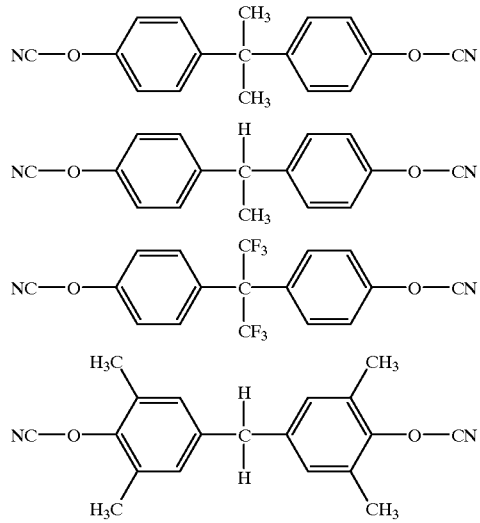

The di- and polycyanates used, and their prepolymers, are either commercially available or can be prepared advantageously by treating the corresponding phenols with cyanogen bromide (cf. "Organic Syntheses", Vol. 61 (1983), pp. 35 to 38).

The nonlinear optically active compounds, i.e. the chromophores, have a substituent E through which the chromophore is linked to the organic dicyanate and polycyanate components. In the copolymers the molar ratio of the dicyanate and polycyanate units to the chromophore units is preferably between 95:5 and 50:50 and most preferably between 93:7 and 65:35. The chromophore substituent of the copolymers is stable towards thermal oxidation to above 200° C. and embedding the chromophore compound in the polyadduct matrix surprisingly affords the ability to vary the optical properties over a broad range.

With regard to the nonlinear optically active compounds reference can be made to U.S. patent application Ser. No. 09/265,157 filed Mar. 9, 1999 ("Chromophoric Compounds and Process for their Preparation"). In addition, the synthesis of representative chromophores and their precursors, the chemical linkage of the chromophores to the polyadduct matrix, and the preparation of the nonlinear optically active copolymers are also described in the exemplary embodiments according to the invention.

The copolymers according to the invention, i.e. the polyadducts, can be obtained by coaddition of the organic di- or polycyanates—or preferably of their prepolymers—with the nonlinear optically active chromophores, thermally initiated, preferably by heating in the range 110–200° C., or catalytically accelerated, preferably with a metal acetylacetonate catalyst such as copper (II) acetylacetonate. The polymerization reaction is interrupted before the gel point is reached in order to obtain soluble products. The molar weights of these products lie in the range from 500 to 10,000,000 g/mol, advantageously in the range from 1,000 to 1,000,000 g/mol.

The nonlinear optically active copolymers according to the invention can be used to produce polymeric materials and electro-optical and photonic components with stable nonlinear optical properties.

It is accordingly a further object of this invention to provide NLO active polymeric materials with stable nonlinear optical properties, which are based on a nonlinear optically active copolymer as reported above.

With the foregoing and other objects in view, it is provided that, depending on the purpose of the application, auxiliary processing agents can be added to the polymeric materials according to the invention in order to improve their surface characteristics, their processability and/or their compatibility with polymers. Examples of such auxiliary processing agents are thixotropic agents, flow agents, plasticizers, surface-active agents, internal lubricants and binding agents.

The NLO polymeric materials according to the invention are applied to a substrate in solution—together with compounds effective as cross-linking agents—by spin-coating, dipping, printing or painting, preferred solvents include cyclohexanone, 2-methylcyclohexanone, N-methylpyrrolidone, γ-butyrolactone and mixtures thereof. In this way a nonlinear optical structure is obtained whereby the polymeric materials are brought into dipolar alignment in electric fields during the gradual heating up to the glass transition temperature, and then cross-linking takes place immediately afterwards under kinetic control. After cooling, polymeric materials are obtained with outstanding nonlinear optical properties and—as a result of the cross-linking—with increased orientation stability and therefore increased long-term stability even when used at higher temperatures. Because of their stability and capability for being modified the polymeric materials with nonlinear optical properties according to the invention are suitable for the production of electro-optical and photonic components which are used in non-linear optics.

It is accordingly a further object of this invention to provide electro-optical and photonic components which include at least one functional layer of a cross-linked copolymer according to the invention in oriented form.

With the above and other objects in view, production of the functional layer preferably proceeds through applying a nonlinear optical copolymer according to the invention to a suitable carrier material such as glass, ITO-coated glass (ITO=indium tin oxide) or silicon wafer, for example through so-called spin-coating or other process suitable for generating thin layers. The cross-linking is then performed in a suitable manner at increased temperature, possibly with simultaneous polar alignment. Exact procedures are given in the exemplary embodiments.

In a preferred embodiment of this invention, the functional layer of NLO polymeric material is not applied directly to the carrier material but is positioned between two buffer layers. In this structure the buffer layers serve to decouple the optical signals from the electrodes in order to keep the attenuation as low as possible. Preferably at least one buffer layer includes a corresponding cross-linked NLO polymeric material which has a lower chromophore content than the polymeric material of the functional layer.

For production of the nonlinear optical materials it is especially advantageous to use oligomeric prepolymers of the polyadducts according to the invention. The preparation of these prepolymers proceeds according to known procedures whereby the appropriately substituted nonlinear optically active chromophores are allowed to react with an excess of the di- or polycyanate compound effecting the cross-linking. After application to a substrate the prepolymers are brought into polar alignment above the glass transition temperature and then cross-linked with applied electric field to afford the nonlinear optically active polyadducts with improved characteristics profile.

Other features which are considered as characteristic for the invention are set forth in the appended claims.

Although the invention is illustrated and described herein as embodied in nonlinear optically active copolymers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

The exemplary embodiments are intended to explain the invention in detail. These describe first the synthesis of nonlinear optically active compounds, then synthesis of the cyanate resins used in the context of the invention and the introduction of the nonlinear optically active chromophores into the copolymers, and finally the synthesis of the nonlinear optically active polymeric materials.

The following abbreviations are used in the examples:

m.p. melting point b.p. boiling point dec. decomposition

DESCRIPTION OF THE PREFERRED EMBODIMENTS

EXAMPLE 1 a) One-tenth mol of m-aminophenol in 150 ml methanol is treated with 0.11 mol of n-butyl bromide and 0.1 mol of NaHCO$_3$ and the mixture is heated under reflux for 5 h. After cooling, the reaction mixture is filtered and the solvent removed under reduced pressure. The residual oil is vacuum fractionated to give 3-(n-butylamino)phenol.

Yield 57%; b.p. 110° C. (6×10$^{-5}$ torr); m.p. 35° C.

b) 0.1 mol of 3-(n-butylamino)phenol in 100 ml of methanol is heated under reflux for 10 h with 0.11 mol of 2-bromoethanol and 0.1 mol of NaHCO$_3$. After cooling, the reaction mixture is filtered, the solvent removed under reduced pressure and the residue fractionated to give 3-[N-(n-butyl)-N-(2-hydroxyethyl)amino]phenol.

Yield 54%; b.p. 130–140° C. (5×10$^{-5}$ torr); m.p. 45–47° C.

c) 0.05 mol of the product from b) is dissolved in 50 ml of propanol saturated with HCl and treated with 0.1 mol of isoamyl nitrite. After 20 min 150 ml of diethyl ether is added and the product formed is filtered by suction to give 2-nitroso-5-[N-(n-butyl)-N-(2-hydroxyethyl)amino]phenol hydrochloride.

Yield 76%; m.p. 127° C. (dec.)

d) 0.01 mol of the product from c) is heated briefly to boiling with 0.011 mol of 1-naphthylmalononitrile and 0.02 mol of triethylamine in 15 ml of dimethylformamide. After cooling, water is added and the precipitated product extracted with dichloroethane. After evaporation of the solvent the residue is purified by repeated chromatography on silica gel using ethyl acetate as eluent to give benzo[a]-5-dicyanomethylene-9-[N-(n-butyl)-N-(2-hydroxyethyl)amino]-7,12-phenoxazine, a compound of the following structure:

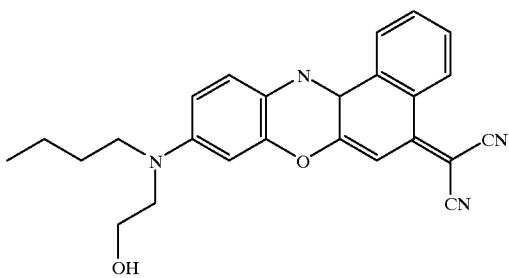

Yield 30%; m.p. 190° C.; $\lambda_{max}$ 618 nm (in toluene).

e) 0.01 mol of the compound obtained from d) and 0.015 mol of 4-hydroxybenzoic acid are dissolved with stirring under an inert atmosphere in 100 ml of anhydrous N-methylpyrrolidone. After complete dissolution 0.02 mol of carbonyldiimidazole is added in portions and the mixture is then heated at 70° C. for 6 h. The solution of the reaction product is then diluted with water and extracted with methylene chloride. The methylene chloride phase is dried and the methylene chloride evaporated off. The crude product is recrystallized from ethyl acetate to give the 4-hydroxybenzoate of benzo[a]-5-dicyanomethylene-9-[N-(n-butyl)-N-(2-hydroxyethyl)amino]-7,12-phenoxazine.

Yield 85%; m.p. 124° C.

EXAMPLE 2 a) One-tenth mol of m-aminophenol in 150 ml of methanol is treated with 0.11 mol of n-heptyl bromide and 0.1 mol of NaHCO$_3$ and the mixture is heated under reflux for 5 h. After cooling, the reaction mixture is filtered and the solvent removed under reduced pressure. The residual oil is vacuum fractionated to give 3-(n-heptylamino)phenol.

Yield 62%; b.p. 130–140° C. (8×10$^{-5}$ torr); m.p. 27–30° C.

b) 0.1 mol of 3-(n-heptylamino)phenol in 100 ml of methanol is heated under reflux for 10 h with 0.11 mol of 2-bromoethanol and 0.1 mol of NaHCO$_3$. After cooling, the reaction mixture is filtered, the solvent removed under reduced pressure and the residue fractionated to give 3-[N-(n-heptyl)-N-(2-hydroxyethyl)amino]phenol.

Yield 54%; b.p. 160–170° C. (1×10$^{-5}$ torr): m.p. 45–47° C.

c) 0.05 mol of the product from b) is dissolved in 50 ml of propanol saturated with HCl and treated with 0.1 mol of isoamyl nitrite. After 20 min 150 ml of diethyl ether is added and the product formed is filtered by suction to give 2-nitroso-5-[N-(n-heptyl)-N-(2-hydroxyethyl)amino]phenol hydrochloride.

Yield 62%; m.p. 129° C. (dec.)

d) 0.01 mol of the product from c) is heated briefly to boiling with 0.011 mol of 1-naphthylmalononitrile and 0.02 mol of triethylamine in 15 ml of dimethylformamide. After cooling, water is added and the precipitated product extracted with dichloroethane. After evaporation of the solvent the residue is purified by repeated chromatography on silica gel using ethyl acetate as eluent to give benzo[a]-5-dicyanomethylene-9-[N-(n-heptyl)-N-(2-hydroxyethyl)amino]-7,12-phenoxazine, a compound of the following structure:

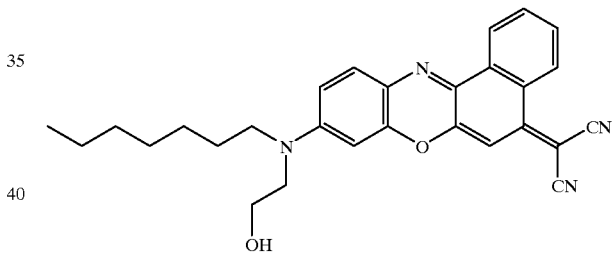

Yield 28%; m.p. 155–157° C.; $\lambda_{max}$ 622 nm (in toluene).

e) 0.01 mol of the compound obtained from d) and 0.015 mol of 4-hydroxybenzoic acid are dissolved with stirring under an inert atmosphere in 100 ml of anhydrous N-methylpyrrolidone. After complete dissolution 0.02 mol of carbonyldiimidazole is added in portions and the mixture is then heated at 70° C. for 6 h. The solution of the reaction product is then diluted with water and extracted with methylene chloride. The methylene chloride phase is dried and the methylene chloride evaporated off. The crude product is recrystallized from ethyl acetate to give the 4-hydroxybenzoate of benzo[a]-5-dicyanomethylene-9-[N-(n-heptyl)-N-(2-hydroxyethyl)amino]-7,12-phenoxazine.

Yield 80%; m.p. 120° C.

EXAMPLE 3

The preparation of 2-dicyanomethylene-6-[N-(n-butyl)-N-(2-hydroxyethyl)amino]thieno[3,2-b]benzo[e]oxazine is carried out in an analogous way to Example 1. The product has the following structure:

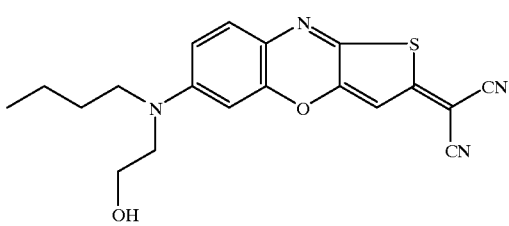

For this purpose 0.01 mol of 2-nitroso-5-[N-(n-butyl)-N-(2-hydroxyethyl)amino]phenol hydrochloride (cf. Example 1c) is heated under reflux for a few minutes in 15 ml of dimethylformamide containing 0.02 mol of triethylamine in the presence of 0.01 mol of 2-thienylmalononitrile prepared in a yield of 45% by reaction of 0.13 mol of malononitrile in 100 ml of absolute tetrahydrofuran with 0.15 mol of sodium hydride, 0.0015 mol of $[(C_6H_5)_3P]_2PdCl_2$ and 25 g of 2-iodothiophene heated under reflux for 3 hours followed by neutralization with hydrochloric acid. After cooling the solution obtained is diluted with water and the resultant precipitated dye is isolated by suction filtration. Purification is carried out by repeated column chromatography on silica gel with ethyl acetate as eluent.

Yield 23%; m.p. 260° C.

0.01 mol of the compound prepared in this way and 0.015 mol of 4-hydroxybenzoic acid are dissolved with stirring under an inert atmosphere in 100 ml of anhydrous N-methylpyrrolidone. After complete dissolution 0.02 mol of carbonyldiimidazole is added in portions and the mixture is then heated at 70° C. for 6 h. The solution of the reaction product is then diluted with water and extracted with methylene chloride. The methylene chloride phase is dried and the methylene chloride evaporated off. The crude product is recrystallized from ethyl acetate to give the 4-hydroxybenzoate of 2-dicyanomethylene-6-[N-(n-butyl)-N-(2-hydroxyethyl)amino]thieno[3,2-b]benzo[e]oxazine.

Yield 83%; m.p. 133° C.

EXAMPLE 4

In a way analogous to Example 2, 2-nitroso-5-[N-(n-heptyl)-N-(2-hydroxyethyl)-amino]phenol hydrochloride (cf. Example 2c) and 1,8-naphthosultam were reacted to produce 9-[N-(n-heptyl)-N-(2-hydroxyethyl)amino]benzo[d]isothiazolo-[3,3a,4-ab]phen-7,12-oxazine-4-dioxide, a phenoxazine dye with the following structure:

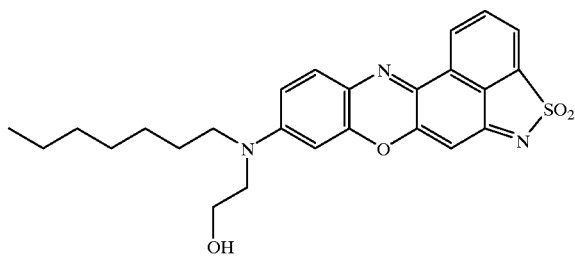

Yield 35%; m.p. 178–180° C.

The phenoxazine dye is converted to the 4-hydroxybenzoate according to Example 1e.

Yield 83%; m.p. 147° C.

EXAMPLE 5

2.264 g of the nonlinear optical chromophore according to Example 1 is dissolved with stirring in a melt of 2.736 g of the dicyanate of bisphenol A (see formula (2): $R^1$ to $R^4$=H, $M=C(CH_3)_2$. The resulting homogeneous melt is prepolymerized at 130° C. The addition polymerization is interrupted by quenching after 25 min to give a quantitative yield of a polyadduct soluble in customary lacquer solvents. This polyadduct is processed from a solution to nonlinear polymer films.

EXAMPLE 6

3.342 g of the nonlinear optical chromnophore according to Example 2 is dissolved with stirring in a melt of 3.658 g of the dicyanate of bisphenol A (see formula (2): $R^1$ to $R^4$=H, $M=C(CH_3)_2$. The resulting homogeneous melt is prepolymerized at 130° C. The addition polymerization is interrupted by quenching after 35 min to give a quantitative yield of a polyadduct soluble in customary lacquer solvents. This polyadduct is processed from a solution to nonlinear polymer films.

EXAMPLE 7

In a corresponding way to Example 6 a polyadduct is prepared from 6.89 g of the dicyanate of bisphenol A and 3.11 g of the non-linear optical chromophore according to Example 2 and this polyadduct processed to polymer films.

EXAMPLE 8

In a corresponding way to Example 6 a polyadduct is prepared from 3.41 g of the dicyanate of bisphenol A and 0.57 g of the non-linear optical chromophore according to Example 2 and this polyadduct processed to polymer films.

EXAMPLE 9

For cross-linking, the polymers, i.e. the polyadducts of cyanate resin and functionalized nonlinear optically active compound are applied by spin-coating from a solution onto suitable carrier materials such as glass, ITO-coated glass (ITO=indium tin oxide) or silicon wafer, baked for 30 minutes—for example at 100° C.—until the film has stabilized and then cured at higher temperature in an atmosphere of inert gas, if necessary with addition of suitable catalysts such as acetyl acetonate and 1,4-diazabicyclo[2,2,2]octane. The reaction conditions and the results obtained are listed in the following table.

| Polymer of Example | Curing temperature/time | Chromophore content % by weight |
|---|---|---|
| 5 | 140° C./1 h<br>160° C./1 h | 45.3 |
| 6 | 140° C./1 h<br>180° C./1 h | 47.7 |
| 7 | 140° C./1 h<br>180° C./1 h | 31.1 |
| 8 | 140° C./1 h<br>180° C./1 h<br>200° C./30 min | 14.6 |

EXAMPLE 10

For the electro-optical investigations the polyadducts according to the invention or corresponding prepolymers, and cross-linking compounds when present, are applied in a suitable solvent by means of spin-coating to ITO-coated glass; films prepared in this way normally have a thickness of 3 to 6 μm. For electric poling a gold electrode is sputtered onto the film of the polyadduct in order to achieve high non-centrosymmetric orientation; the counter-electrode in this case is the transparent ITO layer. After heating the sample to the region of the glass transition temperature d.c. voltage is applied whereby the necessary voltage increase is adjusted to the orientation behavior of the nonlinear optical molecular units in order to avoid electric breakdown with resulting destruction of the film. After reaching a poling field strength of 50 to 100 V/μm a poling period of 15 min is sufficient for orientation of the nonlinear optical molecular units. The film is then cross-linked thermally, and the sample is then cooled down to room temperature with the applied field held constant, thereby fixing the orientation.

The electro-optical investigation of the polymer samples is performed by inclined radiation with a laser beam which is then measured using interferometry after single reflection at the gold electrode. The necessary equipment for measuring and method of evaluating the results are known (see for example: "Appl. Phys. Lett.", Vol. 56 (1990), pp. 1734 to 1736).

EXAMPLE 11

For the fabrication of electro-optical components, for example an electro-optical phase modulator (see R. C. Alferness "Titanium-Diffused Lithium Niobate Waveguide Devices" in T. Tamir "Guided-Wave Optoelectronics", Springer-Verlag, Berlin Heidelberg N.Y., 1988, p. 155) the non-linear optical polymers according to Examples 5 to 7 are used. A metallic electrode is applied to a suitable substrate, for example a silicon wafer, or the substrate itself is used as an electrode if it has suitable electrical conductivity. Two layers of the polyadduct are applied successively to the substrate, for example by spin-coating. The first layer consists of a polyadduct according to Example 8 with a chromophore content of 14.6 weight % and the second layer consists of a polyadduct according to one of the Examples 5 to 7 with a chromophore content of 31.1, 45.3 or 47.7 weight % respectively. The first layer is cured according to Example 9 and then the second layer is applied and baked for 30 min at 100° C. to stabilize the film. The compositions of the two layers are slightly different so that there is a small refractive index difference between the two layers of, for example, 0.01 to 0.02; however, the chromophore content of the two layers can be almost equal. Each of the two layers is 2 to 4 μm thick. A strip waveguide with a width of 4 to 7 μm is generated in the second layer using known methods of photobleaching and a suitable photomask. An electrode for poling the chromophore is then applied, situated above the waveguide structure; the metallic photomask for structuring the waveguide can be used for this. For poling and curing the second polyadduct layer an electric field is applied, generally with a field strength of 100 V/μm, and then the curing cycle according to Example 9 is performed. After removal of the metallic electrode (and if necessary the photomask) an upper covering layer, whose composition and thickness correspond to the layer applied first, is applied and cured. A further metallic electrode is then applied to this upper covering layer as a strip electrode, located above the strip waveguide. By sawing the substrate with the applied polymer layers it is possible to produce end surfaces for the coupling and decoupling of light. In a component of the kind mentioned it is possible to achieve in this way an electro-optical coefficient of approx. 30 to 50 pm/V in the strip waveguide.

After polarization the cross-linked polymeric materials according to the invention show high orientation stability up to 180° C. The chromophores contained therein have outstanding thermal stability so that the materials are suitable for the fabrication of technically useful electro-optical and photonic components with long-term stability.

We claim:
1. A nonlinear optically active copolymer, comprising a polyadduct of
   (a) at least one organic cyanate having at least two cyanate groups, and
   (b) a nonlinear optically active compound with the following structure:

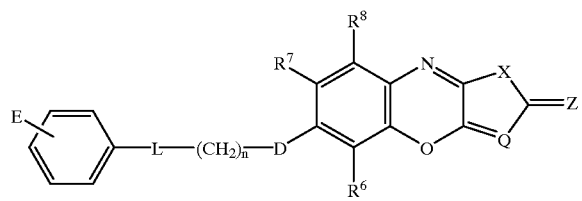

in which
n is 2 to 6,
$R^6$, $R^7$, and $R^8$ are independently of one another an H atom, a straight-chain or branched-chain $C_1$- to $C_{20}$-alkyl residue which is interrupted by 0 to 5 ether oxygen groups, or a phenyl, naphthyl, thienyl, thiazolyl or pyridyl residue,
D is O, S or $NR^9$, whereby $R^9$ is a hydrogen atom, a straight-chain or branched-chain $C_1$- to $C_{20}$-alkyl residue which is interrupted by 0 to 5 ether oxygen groups, a benzyl residue or a phenyl or naphthyl residue,
L is O, COO or OCO,
E is OH, $NH_2$, OCN or a residue with the structure

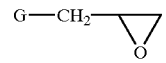

wherein G is O, OCO (O at $CH_2$) or $NR^{10}$, whereby $R^{10}$ is an H atom or a straight-chain $C_1$- to $C_6$-alkyl residue,
Z is an electron-acceptor substituted methylene or imino group,
X is S, O, $NR^{11}$ or a ring double bond or

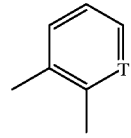

wherein $R^{11}$ is a hydrogen atom, a straight-chain or branched-chain $C_1$- to $C_{20}$-alkyl residue or a phenyl or naphthyl residue and T is CH or N or Z and T together form a structure of type =N—$SO_2$—C , =N—CS—C or =N—CO—C, and
Q is a CH— or $CR^{12}$ -group or N, whereby $R^{12}$ is a straight-chain or branched-chain $C_1$- to $C_{20}$-alkyl residue or a phenyl or naphthyl residue.

2. A copolymer according to claim 1, in which the molar ratio of the cyanate units to the nonlinear optically active units is from 95:5 to 50:50.

3. A copolymer according to claim 1, in which the organic cyanate has the following structure:

(1)

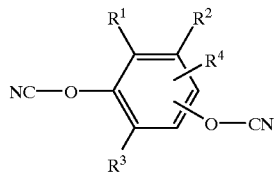

in which

R$^1$, R$^2$, R$^3$, R$^4$ is H, halogen, C$_1$- to C$_{10}$-alkyl, C$_3$- to C$_6$-cycloalkyl, C$_1$- to C$_{10}$-alkoxy phenyl, or an alkyl or phenyl group that is fully or partly fluorinated;

(2)

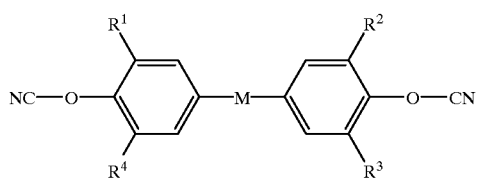

in which

M represents a chemical bond, O, S, SO$_2$, CF$_2$, CH$_2$, CH(CH$_3$), —C(CH$_3$)$_2$—, —C(CF$_3$)$_2$—, N═N, CH═CH, COO, CH═N, CH═N—N═CH, alkylenoxyalkylene with a C$_1$- to C$_8$-alkyl residue or a residue with the structure

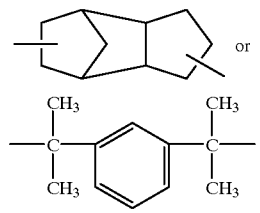

wherein R$^1$, R$^2$, R$^3$ and R$^4$ have the meaning given above; or (3)

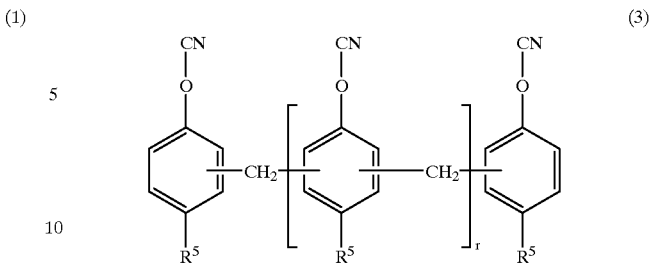

in which r is 0 to 20,

R$^5$ is H or C$_1$- to C$_5$-alkyl.

4. A copolymer according to claim 1, in which the organic cyanate has the following structure:

NC—O—(CF$_2$)$_p$—O—CN wherein p is an integer from 4 to 12.

5. A copolymer according to claim 3 in which each of R$^1$ to R$^5$ represents a hydrogen atom.

6. A copolymer according to claim 3, in which the organic cyanate has structure (2) and M represents C(CH$_3$)$_2$.

7. A copolymer according to claim 1, in which the residue Z represents a dicyanomethylene, alkoxycarbonylcyanomethylene, cyanoimino or alkoxycarbonylimino group.

8. A copolymer according to claim 1, in which X represents a 1,2-annellated benzene ring.

9. A copolymer according to claim 1, in which Y represents a CH group.

10. A copolymer according to claim 1, in which each of R$^6$, R$^7$, and R$^8$ represents a hydrogen atom.

11. A copolymer according to claim 1, in which D represents NR$^9$ wherein R$^9$ is alkyl having 4 to 7 carbon atoms.

12. A copolymer according to claim 1 in which n is 2.

13. A copolymer according to claim 1 in which L is COO.

14. A copolymer according to claim 1 in which E represents OH.

* * * * *